US010489597B2

(12) United States Patent
Safford et al.

(10) Patent No.: US 10,489,597 B2
(45) Date of Patent: Nov. 26, 2019

(54) BLOCKCHAIN VERIFICATION OF NETWORK SECURITY SERVICE

(71) Applicant: General Electric Company, Schenectady, NY (US)

(72) Inventors: David Safford, Niskayuna, NY (US); Atul Kshirsagar, San Ramon, CA (US); William David Smith, II, Schenectady, NY (US); Richard Paul Messmer, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 15/471,432

(22) Filed: Mar. 28, 2017

(65) Prior Publication Data

US 2018/0287780 A1 Oct. 4, 2018

(51) Int. Cl.
*G06F 21/57* (2013.01)
*H04L 29/06* (2006.01)
(Continued)

(52) U.S. Cl.
CPC ............ *G06F 21/575* (2013.01); *G06F 21/51* (2013.01); *G06F 21/577* (2013.01); *G06F 21/64* (2013.01); *H04L 9/0897* (2013.01); *H04L 9/3236* (2013.01); *H04L 9/3297* (2013.01); *H04L 63/06* (2013.01); *H04L 63/123* (2013.01); *H04L 67/42* (2013.01); *H04L 2209/38* (2013.01)

(58) Field of Classification Search
CPC ......... H04L 9/0637; H04L 9/30; H04L 63/06; H04L 63/123; H04L 67/42; H04L 2209/127; G06F 21/51; G06F 21/575; G06F 21/577; G06F 21/64

USPC .......................................................... 713/161
See application file for complete search history.

(56) References Cited

U.S. PATENT DOCUMENTS

| 9,087,200 B2 | 7/2015 | McKeen et al. |
| 2015/0128240 A1 | 5/2015 | Richards et al. |
| (Continued) | | |

FOREIGN PATENT DOCUMENTS

| CN | 105488675 A | 4/2016 |
| WO | 2016171349 A2 | 10/2016 |

OTHER PUBLICATIONS

Van der Hooff, Jelle et al., "VerSum: Verifiable Computations over Large Public Logs", Proceedings CCS '14 Proceedings of the 2014 ACM SIGSAC Conference on Computer and Communciations, Nov. 3, 2014, DOI: 10.1145/2660267.2660327, 13pgs.

*Primary Examiner* — Michael Pyzocha
*Assistant Examiner* — Zoha Piyadehghibi Tafaghodi
(74) *Attorney, Agent, or Firm* — Buckley, Maschoff & Talwalkar, LLC

(57) ABSTRACT

According to some embodiments, a system may include a communication port to exchange information with a client device associated with an industrial control system. A network security server coupled to the communication port may include a computer processor adapted to provide a network security service for the client device. The computer processor may further be adapted to record security information about the client device via a blockchain verification process (e.g., by registering a validation result within a distributed ledger). The network security service might comprise, for example, an integrity attestation service providing software verification for the client device.

15 Claims, 18 Drawing Sheets

(51) Int. Cl.
*G06F 21/64* (2013.01)
*G06F 21/51* (2013.01)
*H04L 9/08* (2006.01)
*H04L 9/32* (2006.01)

(56) References Cited

U.S. PATENT DOCUMENTS

| | | | |
|---|---|---|---|
| 2015/0128274 A1* | 5/2015 | Giokas | H04L 63/1416 |
| | | | 726/23 |
| 2016/0162897 A1 | 6/2016 | Feeney | |
| 2016/0217436 A1 | 7/2016 | Brama | |
| 2016/0269182 A1* | 9/2016 | Sriram | H04L 9/3242 |
| 2016/0269402 A1* | 9/2016 | Carter | H04L 9/0816 |
| 2016/0275461 A1 | 9/2016 | Sprague et al. | |
| 2016/0294783 A1* | 10/2016 | Piqueras Jover | H04L 63/0442 |
| 2016/0321654 A1 | 11/2016 | Lesavich et al. | |
| 2016/0323109 A1 | 11/2016 | McCoy et al. | |
| 2017/0075938 A1* | 3/2017 | Black | G06F 21/602 |
| 2017/0078493 A1* | 3/2017 | Melika | H04M 15/48 |

* cited by examiner

INTEGRITY MEASUREMENT ARCHITECTURE

INTEGRITY MEASUREMENT ARCHITECTURE RUN-TIME ATTESTATION REPORT

CONTROLLER INTEGRITY STATUS: WARNING

Signature Error:

Unsigned: 1 ~310

Invalid Signature: 0

Missing Key: 0

Actual Integrity Value:
42368ABED4255230895230CC96A978F987CF

Reported Integrity Value:
42368ABED4255230895230CC96A978F987CF

FIG. 3

| FIELD 702 | TYPE 704 | NULL 706 | KEY 708 | DEFAULT 710 | EXTRA 712 |
|---|---|---|---|---|---|
| Record_ID | Int(10) | NO | PRI | NULL | Auto_Increment |
| Client_ID | Varchar(32) | YES | | NULL | |
| Server_ID | Varchar(32) | YES | | NULL | |
| Record_Date | datetime | YES | | NULL | |
| Record_Hash | Varchar(40) | YES | | NULL | |
| Summary_Path | Varchar(100) | YES | | NULL | |
| Detail_Path | Varchar(100) | YES | | NULL | |
| Status | Int(1) | YES | | NULL | |
| Message_ID | Varchar(42) | YES | | NULL | |

Record_ID → IMA Database Key
Message_ID → Blockchain Transaction UUID
Client_ID, Server_ID, Record_Hash, Message_ID → Data Sent to Blockchain

FIG. 7

INTEGRITY MEASUREMENT ARCHITECTURE:
RUN-TIME ATTESTATION REPORT

ATTESTATION SERVER VERSION: 10.1.2
BLOCKCHAIN VALIDATED

| Client_ID | Record_Date | Status | Blockchain | Details |
|---|---|---|---|---|
| CLIENT-1 | 2018-10-10 10:10:00 | SECURE | VALID | Summary summary details |
| CLIENT-1 | 2018-10-10 10:13:30 | WARNING | VALID | summary details |
| CLIENT-1 | 2018-10-10 10:15:12 | COMPROMISED ~810 | VALID ~820 | summary details |

FIG. 8

BLOCKCHAIN VERIFICATION OF NETWORK SECURITY SERVICE

BACKGROUND

The subject matter disclosed herein relates to industrial control systems and, more particularly, to securing the operation of industrial control systems.

Industrial control systems, such as power generation and transmission systems (e.g., wind, water, and gas turbine systems) and manufacturing systems (e.g., petroleum refineries, chemical manufacturing plants, and the like) are a common feature of modern industry. For such industrial control systems, an industrial controller may generally control the operation of the system. For example, certain devices in the industrial control system (e.g., sensors, pumps, valves, actuators, and the like) may be controlled by, and may report data to, the industrial controller. Furthermore, the industrial controller may execute instructions (e.g., firmware and/or applications) that may generally enable the industrial controller to control the operation of the industrial control system (e.g., a gas turbine system). These instructions may be provided by the manufacturer of the industrial controller. For example, these instructions may be loaded onto the industrial controller before it is installed in the industrial control system. Additionally, industrial controller may offer several different methods of accessing and/or providing instructions to the industrial controller, such as via a network connection or a local port.

If an unauthorized party could gain access to an industrial controller (either physically or through a communications network), the security of the entire industrial control platform might be compromised. For example, the unauthorized party might alter software such that operation of an industrial asset is degraded and/or possibly damage the asset. In some cases, a network security service may help prevent such unauthorized access to client devices (e.g., industrial controllers). For example, an attestation server might verify the integrity of software running on various client devices. If the network security service itself becomes compromised, however, this protection could be circumvented. It would therefore be desirable to provide systems and methods to protect a network security service associated with an industrial control platform.

SUMMARY

According to some embodiments, a system may include a communication port to exchange information with a client device associated with an industrial control system. A network security server coupled to the communication port may include a computer processor adapted to provide a network security service for the client device. The computer processor may further be adapted to record security information about the client device via a blockchain verification process (e.g., by registering a validation result within a distributed ledger). The network security service might comprise, for example, an integrity attestation service providing software verification for the client device.

Some embodiments comprise: means for exchanging, at a network security server, information with a client device; means fort providing a network security service for the client device; and means for recording security information about the client device via a blockchain verification process.

Technical effects of some embodiments of the invention are improved and computerized ways to protect a network security service associated with an industrial control platform. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 3 is a display illustrating more details of a run-time attestation report for a potentially compromised client device.

FIG. 7 is an example of a database table for storing and/or viewing integrity measurement architecture attestation data according to some embodiments.

FIG. 8 is a display illustrating a run-time attestation report that has been blockchain validated in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It may generally be desirable to operate an industrial controller of an industrial control system in a secure fashion. If an unauthorized party gained access to an industrial controller (either physically or through a communications network), he or she might alter the software executing at the control and jeopardize the security of the entire industrial control platform. For example, the unauthorized party might alter software such that operation of an industrial asset is degraded and/or possibly damage the asset or other assets. In some cases, a network security service may help prevent such unauthorized access to client devices (e.g., industrial controllers).

Figure 1:
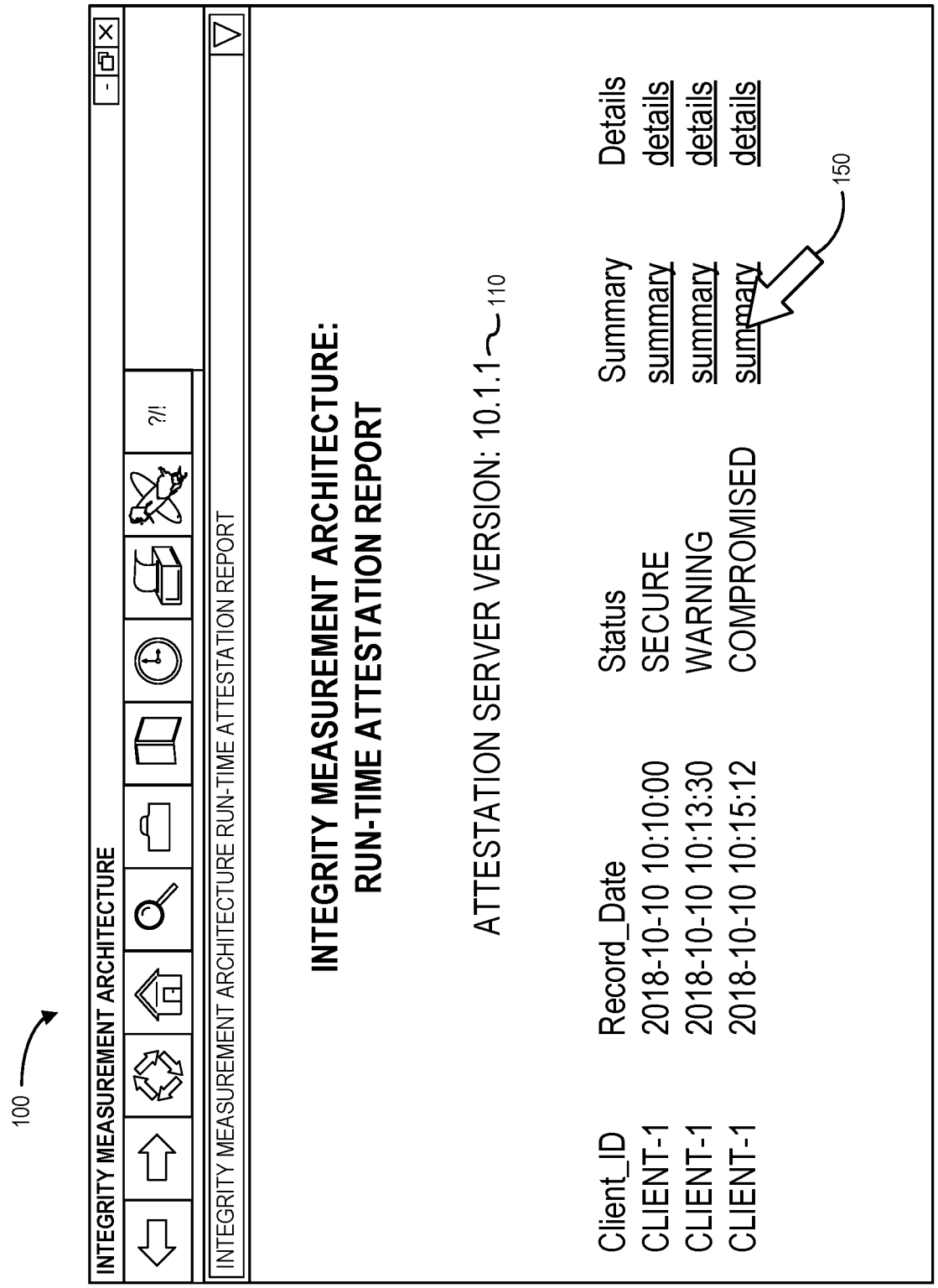
FIG. 1 is a display illustrating a run-time attestation report.

For example, an attestation server might verify the integrity of software running on various client devices. In some cases, the attestation server might generate a report or interactive display (e.g., for a security administrator) that provides the result of a software integrity evaluation. FIG. 1 is one example of a display 100 illustrating such a run-time attestation report. The display indicates a version number 110 of the attestation server along with details about one or more client devices being monitored (e.g., including, for each client device, a client identifier, and a record date and time). The display 100 might also include a status associated with the client device: secure, warning (potentially compromised), and compromised).

Figure 2:
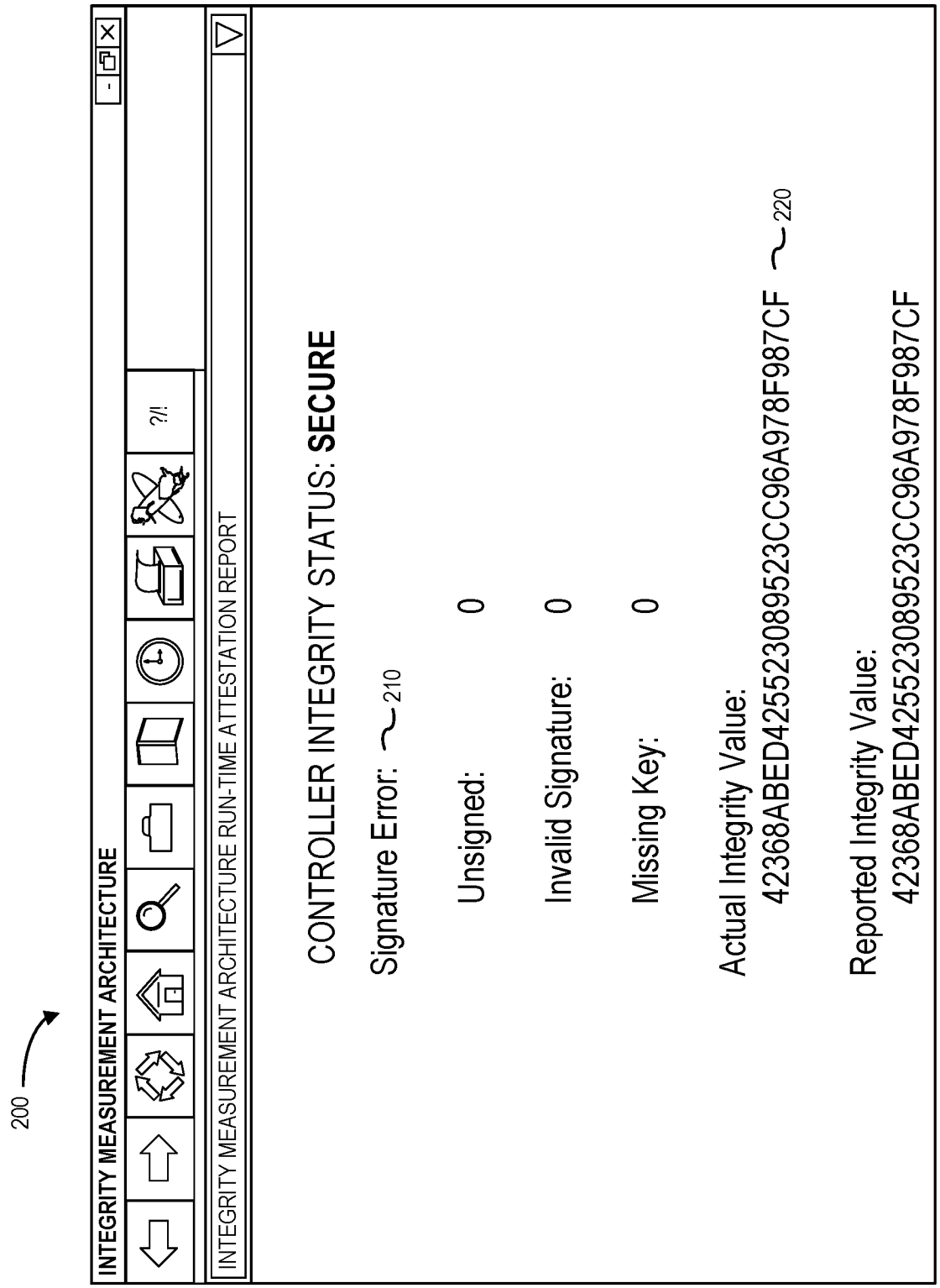
FIG. 2 is a display illustrating more details of a run-time attestation report for a secure client device.

In some cases, the display 100 might further include icons or links that, when selected with a computer mouse pointer 150 or touchscreen, result in a summary display or more detailed display of data. For example, FIG. 2 is a display 200 illustrating more details of a run-time attestation report for a secure client device. In particular, the display includes signature error information 210 indicating that no unsigned software, software with an invalid signature, or software missing a key were detected by the attestation server (as evidenced by the "0" next to each of those data items in FIG. 2). The display 200 also includes an actual integrity value 220 and a reported integrity value that may be compared to determine if the controller was compromised (in the example of FIG. 2, no problem was detected because the actual integrity value exactly matches the reported integrity value).

Figure 4:
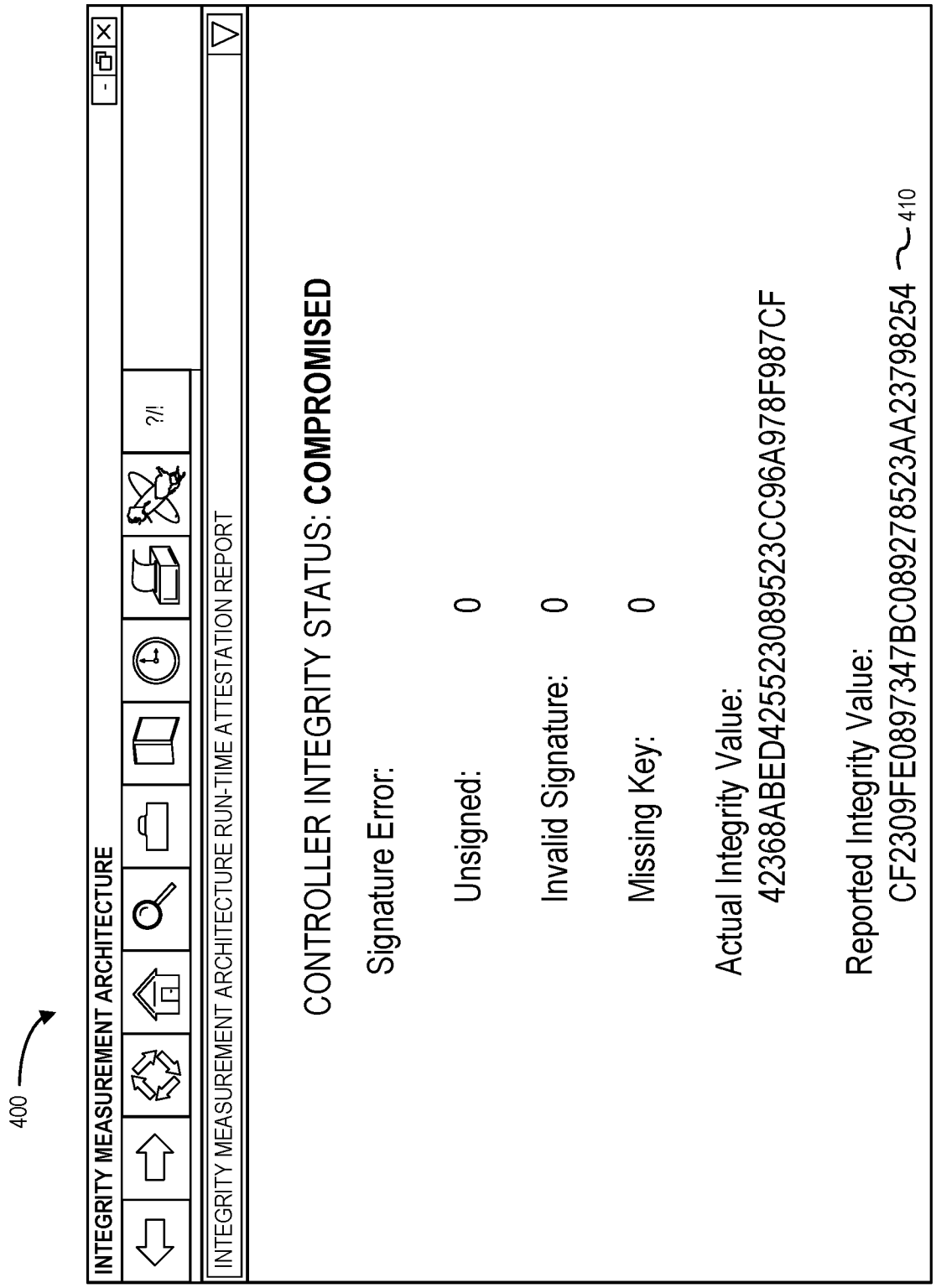
FIG. 4 is a display illustrating more details of a run-time attestation report for a compromised client device.

FIG. 3 is a display 300 illustrating more details of a run-time attestation report for a potentially compromised client device (as indicated by the "Warning" status provided in FIG. 3). In particular, the attestation server has detected unsigned software 310 is associated with the controller (as indicated by the "1" next to that data item in FIG. 3). FIG. 4 is a display 400 illustrating more details of a run-time attestation report for a compromised client device. In this example, the controller is determined to be compromised because the actual integrity value does not match the reported integrity value 410 for the controller. Note that even more detailed information might be provided in an attestation server report, such as detailed information about a hash of platform configuration register values.

Figure 5:
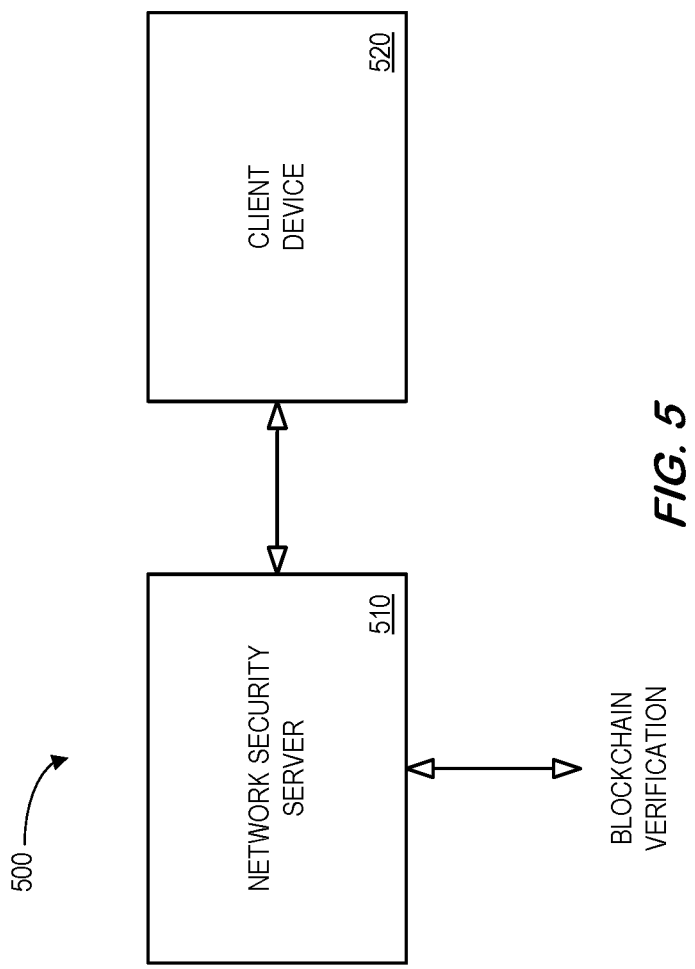
FIG. 5 is a high-level block diagram of a system according to some embodiments.

This type of attestation server information might let a security administrator (or automated process) help detect compromised software and prevent damage. For example, compromised and/or suspicious controllers might be closely monitored or even turned off completely to prevent damage. If the attestation server itself becomes compromised, however, this protection could be circumvented. It would therefore be desirable to provide systems and methods to protect a network security service associated with an industrial control platform. FIG. 5 is a high-level block diagram of a system 500 according to some embodiments. In particular, the system 500 includes a network security server 510 with a communication port to exchange information with a client device 520. According to some embodiments, the network security server 510 provides a network security service for the client device 520 and records security information about the client device 520 via a blockchain verification process. For example, the network security server 510 might record security measurements for the client device 520 via a distributed ledger in accordance with any of the embodiments described herein. According to some embodiments, the distributed ledger might be associated with the HYPERLEDGER® blockchain verification system. Note that the network security server 510 might also be associated with a third party, such as a vendor that performs a service for an enterprise.

The network security server 510 might be, for example, associated with a Personal Computer ("PC"), laptop computer, an enterprise server, a server farm, and/or a database or similar storage devices. According to some embodiments, an "automated" network security server 510 may automatically provide a service for the client device 520 and record security information via a blockchain verification process. As used herein, the term "automated" may refer to, for example, actions that can be performed with little (or no) intervention by a human.

As used herein, devices, including those associated with the network security server 510 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The network security server 510 may store information into and/or retrieve information from data stores. The data stores might, for example, store electronic records representing security information such as a client device identifier, a measured value, a date and time, etc. The data stores may be locally stored or reside remote from the network security server 510. Although a single network security server 510 is shown in FIG. 5, any number of such devices may be included. Moreover, various devices described herein might be combined according to embodiments of the present invention. For example, in some embodiments, the network security server 510, data stores, and/or client devices might be co-located and/or may comprise a single apparatus.

Figure 6:
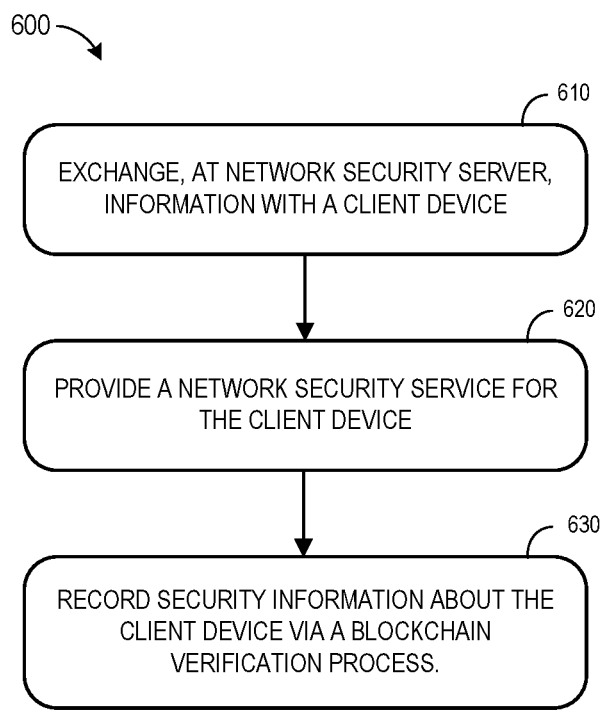
FIG. 6 is a method of protecting an industrial asset control system in accordance with some embodiments.

Note that the system 500 of FIG. 5 is provided only as an example, and embodiments may be associated with additional elements or components. According to some embodiments, the elements of the system 500 automatically protect a network security service and support interactive user interface displays over a distributed communication network. For example, FIG. 6 illustrates a method 600 that might be performed by some or all of the elements of the system 500 described with respect to FIG. 5, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S610, a network security server may exchange information with a client device. According to some embodiments, the network security server may be an attestation server adapted to generate an attestation report for a plurality of remote client devices. The attestation report might include, for example, a client identifier, a recorded date and time, and an attestation status a status indicating one of a secure status, a warning status, and/or a compromised status. As used herein, the phrase "remote client device" might refer to, for example, a PC a tablet computer, a server computer, a smartphone, a microcontroller, an embedded access point, an embedded telecommunication base station, an embedded Internet of Things ("IoT") gateway, an embedded smart building automation device, and/or a digital rights management device.

At S620, the network security server may provide a network security service for the client device. For example, the network security service might be an integrity attestation service providing software verification for the client device. According to some embodiments, the software being verified is associated with a program executing at the client device, such as a Basic Input Output ("IO") System ("BIOS"), an Operating System ("OS"), and/or an application.

At S630, the network security server may record security information about the client device via a blockchain verification process. For example, the recording performed at S630 might include registering a validation result within a distributed ledger. According to some embodiments, the recording performed at S630 is associated with a smart contract transaction that records a device attestation status, a validation hash, a device identifier, and an attestation server identifier. The smart contract might simply be represented by a string of alphanumeric characters or, in some embodiments, the registering may instead be associated with a public cryptography key used by the attestation server. By recording the security information via a blockchain verification process, the information may be securely stored at multiple devices around the world. It may therefore be impractical for an unauthorized party to maliciously corrupt the data at all storage sites simultaneously. The recorded information may, according to some embodiments, be associated with a Trusted Platform Module ("TPM") of the remote client device that provides a hardware root of trust for a measured and trusted boot associated with the industrial control system. For example, the TPM may sign Platform Configuration Register ("PCR") values as proof of integrity.

Note that the attestation report and/or blockchain verification process might be associated with various network configurations including a single network cloud-hosted topology, a multiple network cloud-hosted topology, and/or a participant hosted intranet environment. Moreover, although an attestation server is used herein as an example, note that embodiments may be associated with any other type of network security service, such as a firewall log, a Certificate of Authority, ("CA"), etc.

The security information recorded at S630 can include different types of data about the client device. For example, FIG. 7 is an example of a database table 700 for storing and/or viewing Integrity Measurement Architecture ("IMA") attestation data according to some embodiments. The table 700 might be associated with, for example, the Linux OS, Apache HTTP server software, a MariaDB My Structured Query Language ("SQL") relational database management system, and/or the PHP server side scripting language. The table 700 has columns for a field name, type, a null indication, a key, a default value, and extra information. According to some embodiments, the fields may include a record identifier (e.g., an IMA database key), a client identifier, a server identifier, a record date, a record hash value, a summary path, a details path, a status, and a message identifier. The message identifier might comprise, for example, a Universally Unique Identifier ("UUID") for a blockchain's transaction. Some or all of the data in the table 700 may then be recorded via a blockchain. For example, the client identifier, server identifier, record hash value, and status might be recorded via the blockchain.

Figure 9:
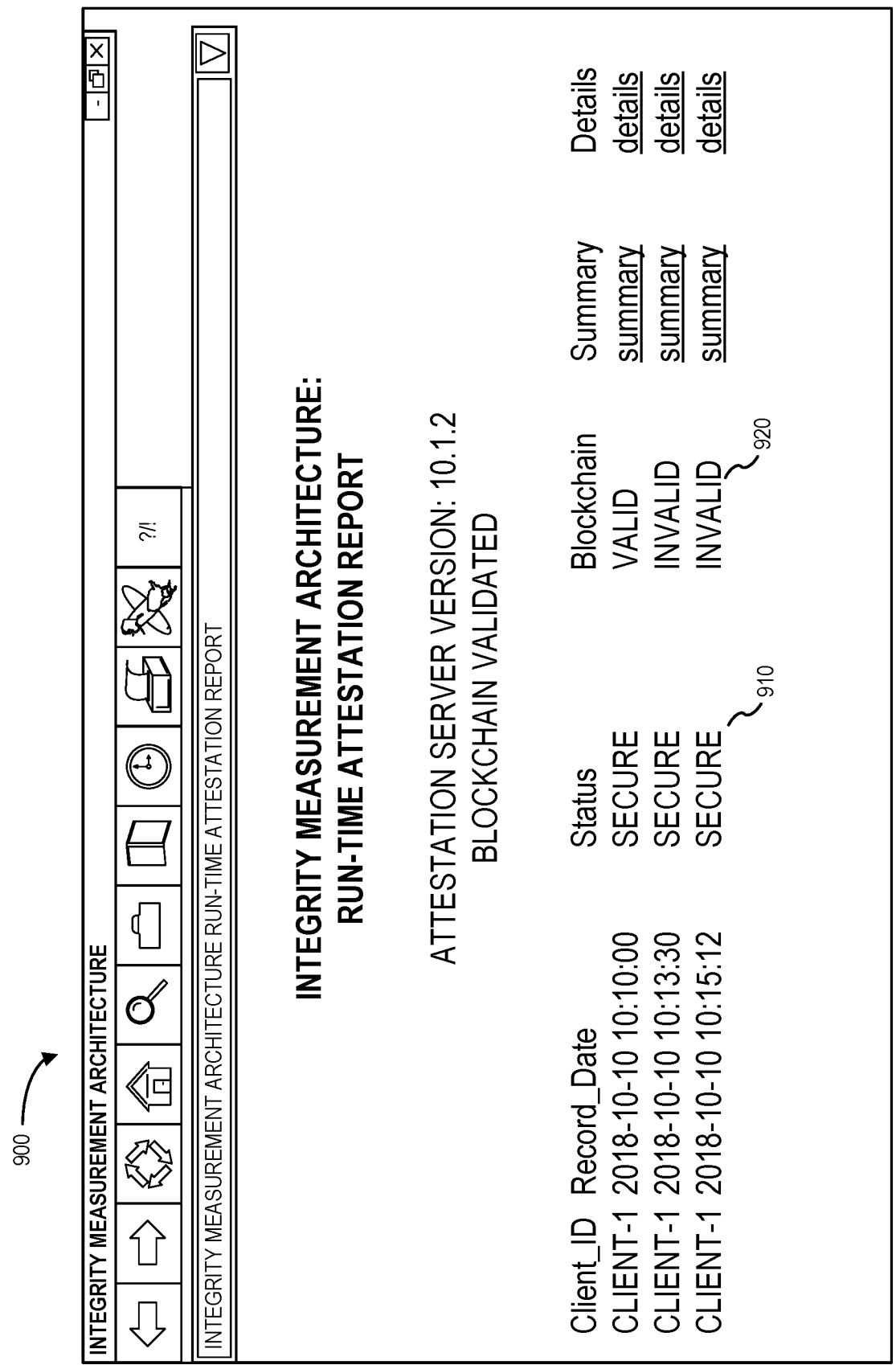
FIG. 9 is a display illustrating a run-time attestation report when blockchain validation has detected a potential problem according to some embodiments.

By recording this data via a blockchain, an attestation server (or other network security service) may securely protect an industrial asset control system. For example, FIG. 8 is a display 800 illustrating a run-time attestation report that has been blockchain validated in accordance with some embodiments. In particular, the display 800 includes a status 810 (e.g., secure, warning, or compromised as described in connection with FIGS. 1 through 4) of one or more client devices. In this embodiment, the display 800 further includes a blockchain indication 820 reflecting if the attestation server itself is valid. For example, FIG. 9 is a display 900 illustrating a run-time attestation report when blockchain validation has detected a potential problem according to some embodiments. In this case, the display 900 indicates that client device has a "secure" status 910. However, the display 900 also indicates that blockchain validation has detected that the attestation server itself may be compromised as reflected by the blockchain indication 920 of "invalid." That is, the status of "secure" for the client device should not be trusted. As a result, a security operator (and/or automated process) might shut down the client device or take other precautionary steps as appropriate to protect the industrial asset control system.

Figure 10:
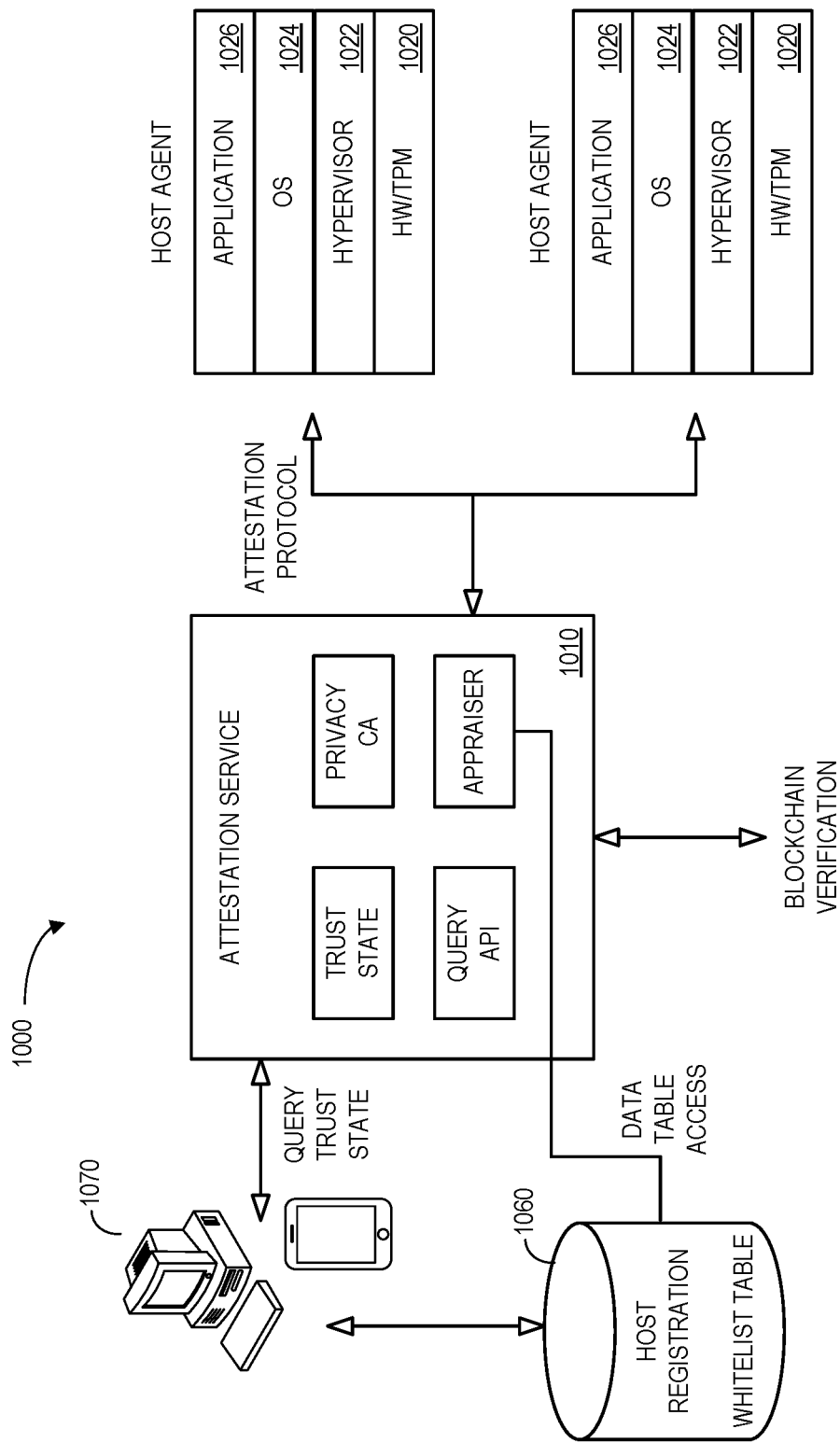
FIG. 10 is a more detailed system providing remote attestation in an integrity measurement architecture in accordance with some embodiments.

FIG. 10 is a more detailed system 1000 providing remote attestation in an IMA in accordance with some embodiments. The system 1000 includes an attestation service 1010 (e.g., a verifier) that communicates with host agents via an attestation protocol to verify the integrity of software executing at the host agents. Each host agent may include hardware/TPM 1020, a "hypervisor" 1022, an OS 1024, and one or more applications 1026. As used herein, the term "hypervisor" 1022 or Virtual Machine Monitor ("VMM") may refer to computer software, firmware, or hardware that runs on a host agent to create and run virtual machines. The hypervisor 1022 may, for example, present the OS 1024 with a virtual operating platform and manage execution of the OS 1024.

A security operator may use remote devices 1070 to execute a query trust state with the attestation service 1010. The attestation service 1010 might include a trust state process, a privacy CA process, a query API process, and an appraiser process (e.g., utilizing a host registration storing certificates and/or a whitelist stored in an external database 1060). Moreover, the attestation service 1010 may utilize blockchain verification to avoid becoming a single point of attack failure. According to some embodiments, multiple independent attestation services 1010 (e.g., verifiers) may be employed to generate a consensus security status.

Figure 11:
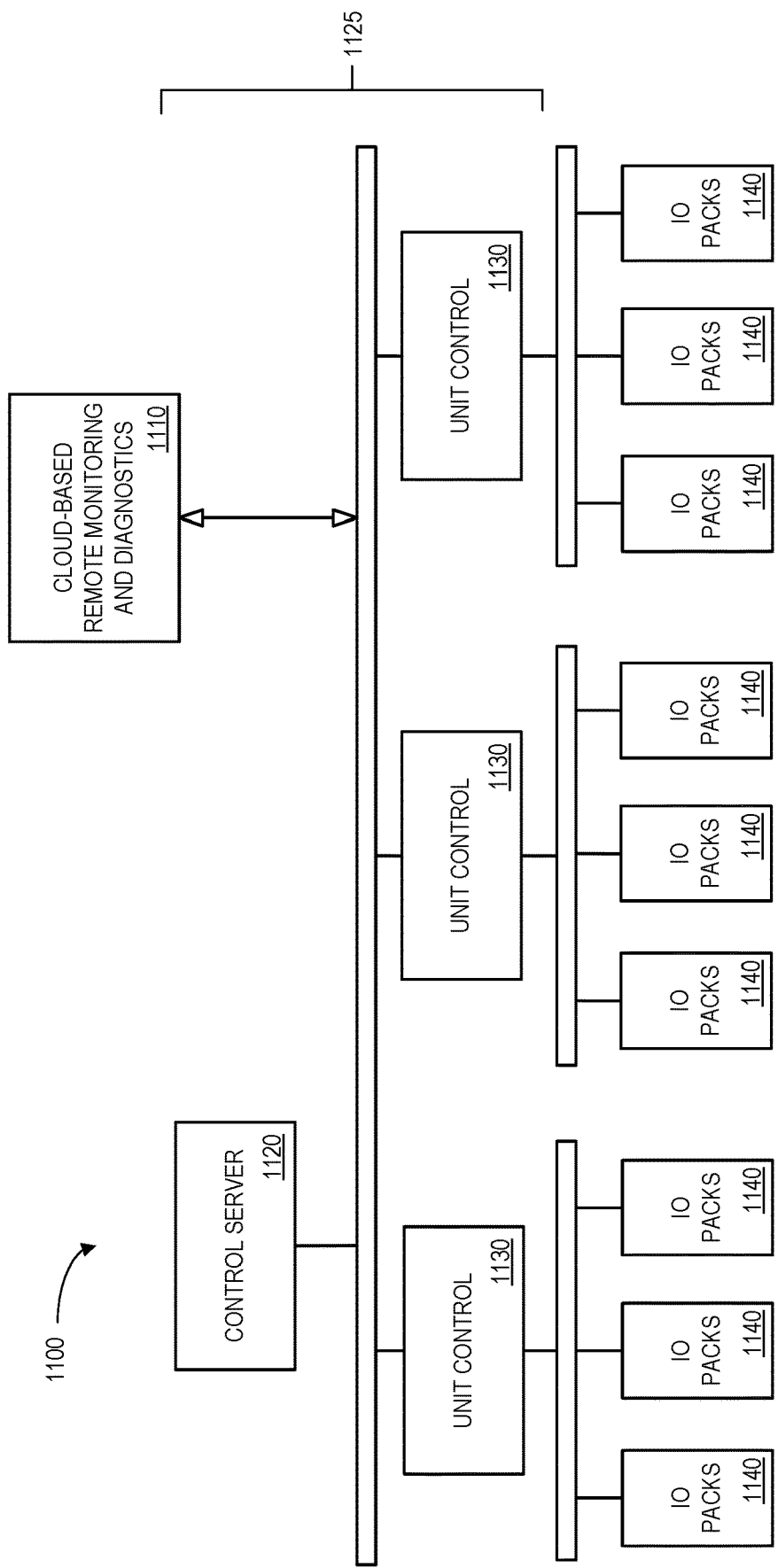
FIG. 11 is a system illustrating an edge-to-cloud approach to security according to some embodiments.

FIG. 11 is a system 1100 illustrating an edge-to-cloud approach to security according to some embodiments. The system 1100 includes a cloud-based remote monitoring and diagnostics element 1110, such as one associated with PRE-DIX® cloud-based services available from General Electric Corporation. The remote monitoring and diagnostics element 1110 may communicate with edge devices 1125, including a control server 1120 (e.g., providing remote connectivity for supervisory and plant control) and unit controllers 1130. The unit controllers 1130 may in turn communicate with IO packs 1140. Moreover, according to some embodiments blockchain validation provides protection for a network security service in the edge-to-cloud approach.

Figure 12:
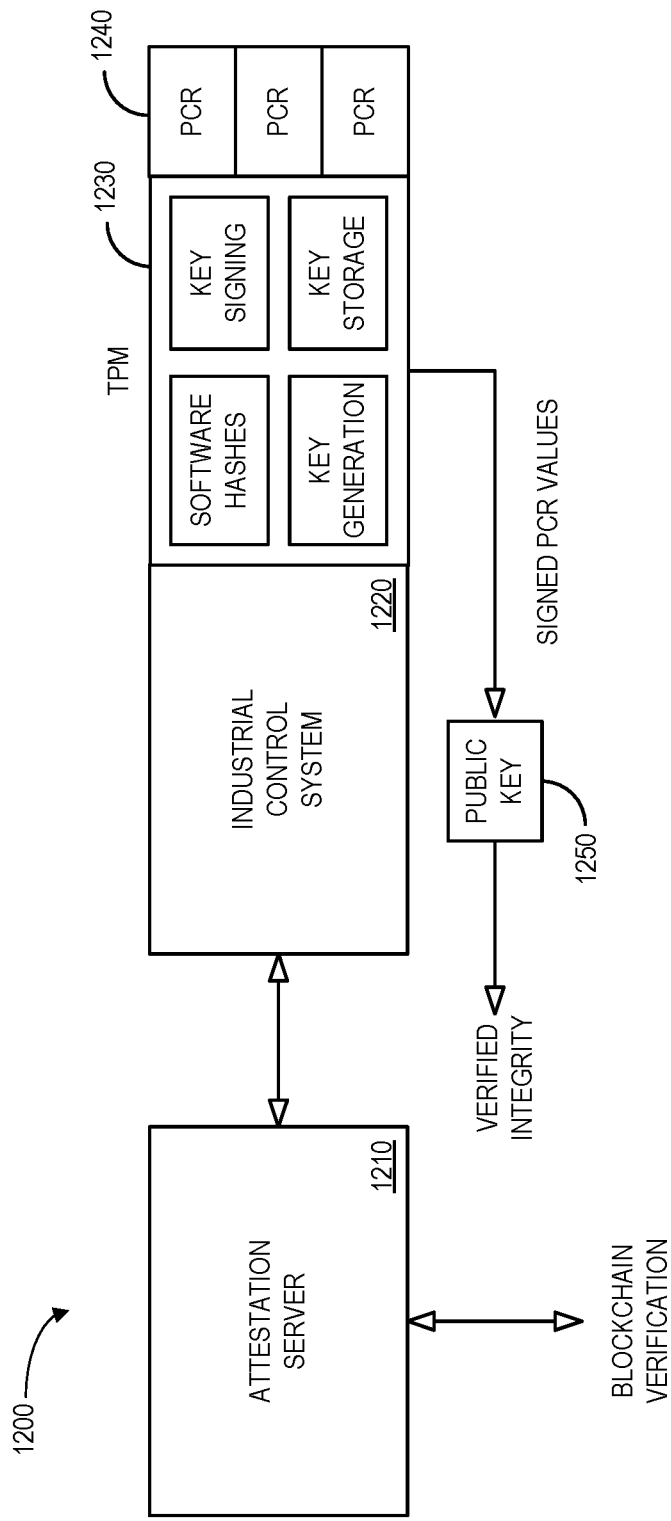
FIG. 12 illustrates an integrity measurement architecture in accordance with some embodiments.

FIG. 12 illustrates an IMA 1200 in accordance with some embodiments. In particular, an attestation server 1210 performs blockchain verification and communicates with an industrial control system 1220 to generate attestation reports. The industrial control system 1220 is associated with a TPM 1230 that provides a hardware root-of-trust. Note that some of the foundational security standards may include those provided by the Trusted Computing Group ("TCG") in the form of TPM devices. TPM devices may ground a root-of-trust in an industrial control system in a tamper hardened device. Note that TPM devices may be as a root-of-trust for measurement and/or for sealing and protecting platform secrets (e.g., encryption keys used for secure local storage and for device authentication). Access to such secrets may then be tied to the integrity measurements associated with the platform.

Note that a security hardened device, such as a TPM device, may be used in a system to provide tamper-resistant storage for various types of security measurements as well as to provide a secure enclave for security critical operations (such as private-key cryptographic operations used to establish device identity in secure communications). Moreover, TPM devices may be either "integrated" TPM devices based in firmware or "discrete" TPM devices that are distinct devices integrated and included in the hardware design and implementation for the ICS component.

According to some embodiments, the TPM 1230 may provide a hardware root-of-trust for a measured and trusted boot (e.g., PCRs 1240 may store hashes of all firmware and software), attestation (e.g., the TPM 1230 may sign PCR 1240 values as proof of integrity), secure key generation and storage (e.g., release disk encryption key only if integrity measurements are good), and/or public key signing and decryption (e.g., public key 1250 exchange for secure communication).

Figure 13:
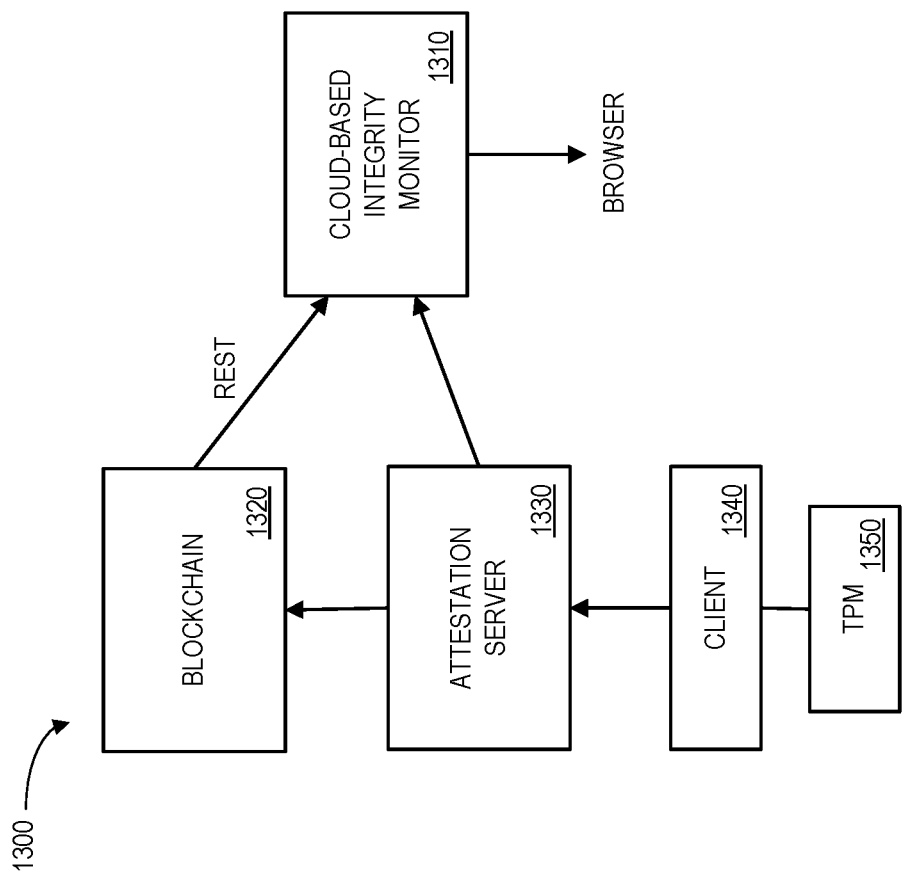
FIG. 13 is a system implementing an attestation architecture incorporating blockchain validation according to some embodiments.
Figure 14:
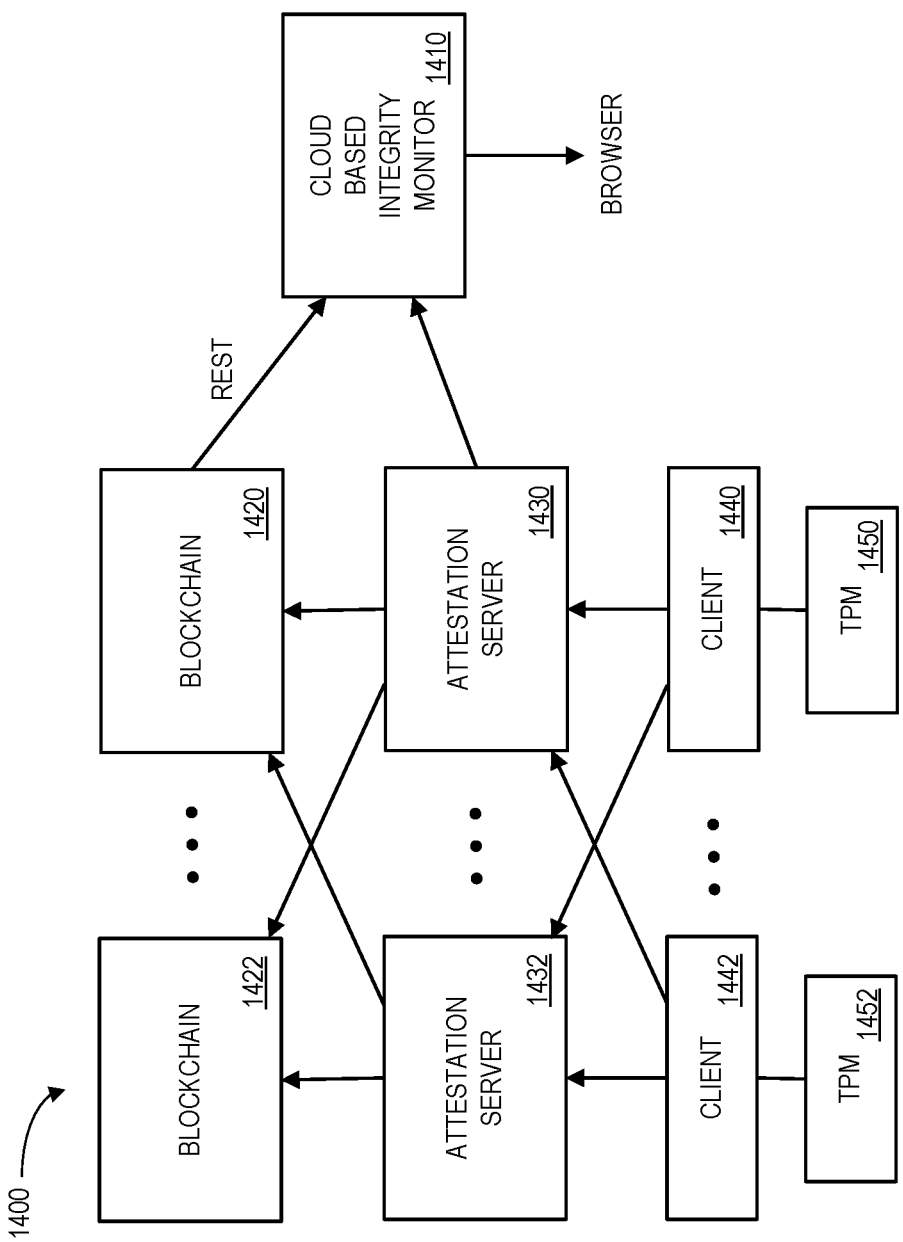
FIG. 14 is a system implementing an attestation architecture incorporating multiple attestation servers in accordance with some embodiments.

FIG. 13 is a system 1300 implementing an attestation architecture incorporating blockchain validation according to some embodiments. A cloud-based integrity monitor 1310 may provide information via a web browser and exchange information with a blockchain 1320 and an attestation server 1330 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, the attestation server 1330 may be associated with a MySQL database. In this way, the attestation server 1330 and blockchain 1320 can be used to provide software verification for a client 1340 and an associated TPM 1350. Although FIG. 13 illustrates a system 1300 with a single blockchain 1320 and attestation server 1330, note that embodiments may employ other topologies. For example, FIG. 14 is a system 1400 implementing an attestation architecture incorporating multiple attestation servers in accordance with some embodiments. In particular, an additional blockchain 1422 and attestation server 1432 may provide protection for an additional client 1442 and associated with TPM 1452. As illustrated in FIG. 14, each attestation server 1430, 1432 may be associated with multiple blockchains 1420, 1422 providing additional protection for the system 1400 (e.g., by storing information at multiple, geographically disperse nodes making attacks impractical). That is, each verifier (e.g., attestation server) may commit a brief summary to an independent data store and, once recorded, the information cannot be changed without detection to provide a tamper-proof System of Records ("SoR").

Figure 15:
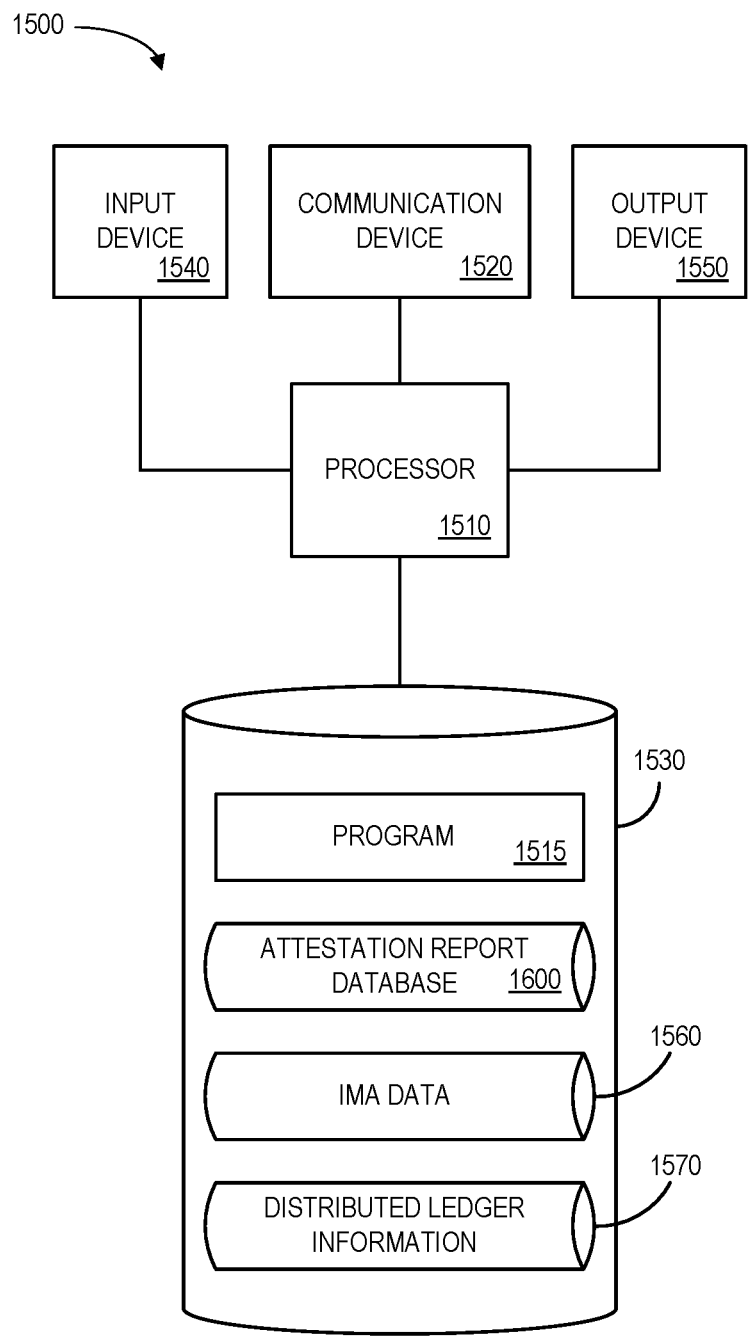
FIG. 15 illustrates a network security service platform according to some embodiments.

Embodiments described herein may comprise a tool to coordinate source code module changes and may be implemented using any number of different hardware configurations. For example, FIG. 15 illustrates a network security service platform 1500 that may be, for example, associated with the systems 100, 1000 of FIGS. 1 and 10, respectively (as well as other systems described herein). The network security service platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote security devices (e.g., PCs and smartphones). Note that communications exchanged via the communication device 1520 may utilize security features, such as those between a public internet user and an internal network of an insurance enterprise. The security features might be associated with, for example, web servers, firewalls, and/or PCI infrastructure. The network security service platform 1500 further includes an input device 1540 (e.g., a mouse and/or keyboard to enter information about a distributed ledger, an industrial controller IMA, etc.) and an output device 1550 (e.g., to output error messages and threat alerts, generate reports regarding security statuses, etc.).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1515 and/or network security service tool or application for controlling the processor 1510. The processor 1510 performs instructions of the program 1515, and thereby operates in accordance with any of the embodiments described herein. For example, the processor 1510 may exchange information with a client device associated with an industrial control system. The processor 1510 may provide a network security service for the client device. The processor 1510 may further record security information about the client device via a blockchain verification process (e.g., by registering a validation result within a distributed ledger). The network security service might comprise, for example, an integrity attestation service providing software verification for the client device.

The program 1515 may be stored in a compressed, uncompiled and/or encrypted format. The program 1515 may furthermore include other program elements, such as an operating system, a database management system, and/or device drivers used by the processor 1510 to interface with peripheral devices.

As used herein, information may be "received" by or "transmitted" to, for example: (i) the network security service platform 1500 from another device; or (ii) a software application or module within the network security service platform 1500 from another software application, module, or any other source.

In some embodiments (such as shown in FIG. 15), the storage device 1530 further stores an attestation report database 1600, IMA data 1560, and distributed ledger information 1570. An example of a database that might be used in connection with the network security service platform 1500 will now be described in detail with respect to FIG. 16. Note that the database described herein is only an example, and additional and/or different information may be stored therein. Moreover, various databases might be split or combined in accordance with any of the embodiments described herein. For example, the attestation report database 1600 and/or IMA data 1560 might be combined and/or linked to each other within the program 1515.

Figure 16:
FIG. 16 is a portion of a tabular attestation report database in accordance with some embodiments.

Referring to FIG. 16, a table is shown that represents the attestation report database 1600 that may be stored at the network security service platform 1500 in accordance with some embodiments. The table may include, for example, entries identifying software integrity reports generated for client devices. The table may also define fields 1602, 1604, 1606, 1608, 1610, 1612, 1614 for each of the entries. The fields 1602, 1604, 1606, 1608, 1610, 1612, 1614 may, according to some embodiments, specify: an attestation report identifier 1602, a client device identifier 1604, a date and time 1606, a status 1608, a blockchain result 1610, summary data 1612, and details data 1614. The attestation report database 1600 may be created and updated, for example, based on information electrically received from remote client devices and/or distributed ledger devices.

The attestation report identifier 1602 may be, for example, a unique alphanumeric code identifying results of a software integrity analysis performed by an attestation server. The client device identifier 1604 might identify a particular industrial controller being verified and the date and time 1606 might reflect when the integrity analysis was performed. The status 1608 might indicate the result of the integrity analysis (e.g., "secure," "warning," or "compromised"). The blockchain result 1610 might indicate, for example, whether the attestation server itself can be verified via a distributed ledger (e.g., "valid" or "invalid"). The summary data 1612 and details data 1614 might contain (or provide links to) additional information about the integrity analysis.

Figure 17:
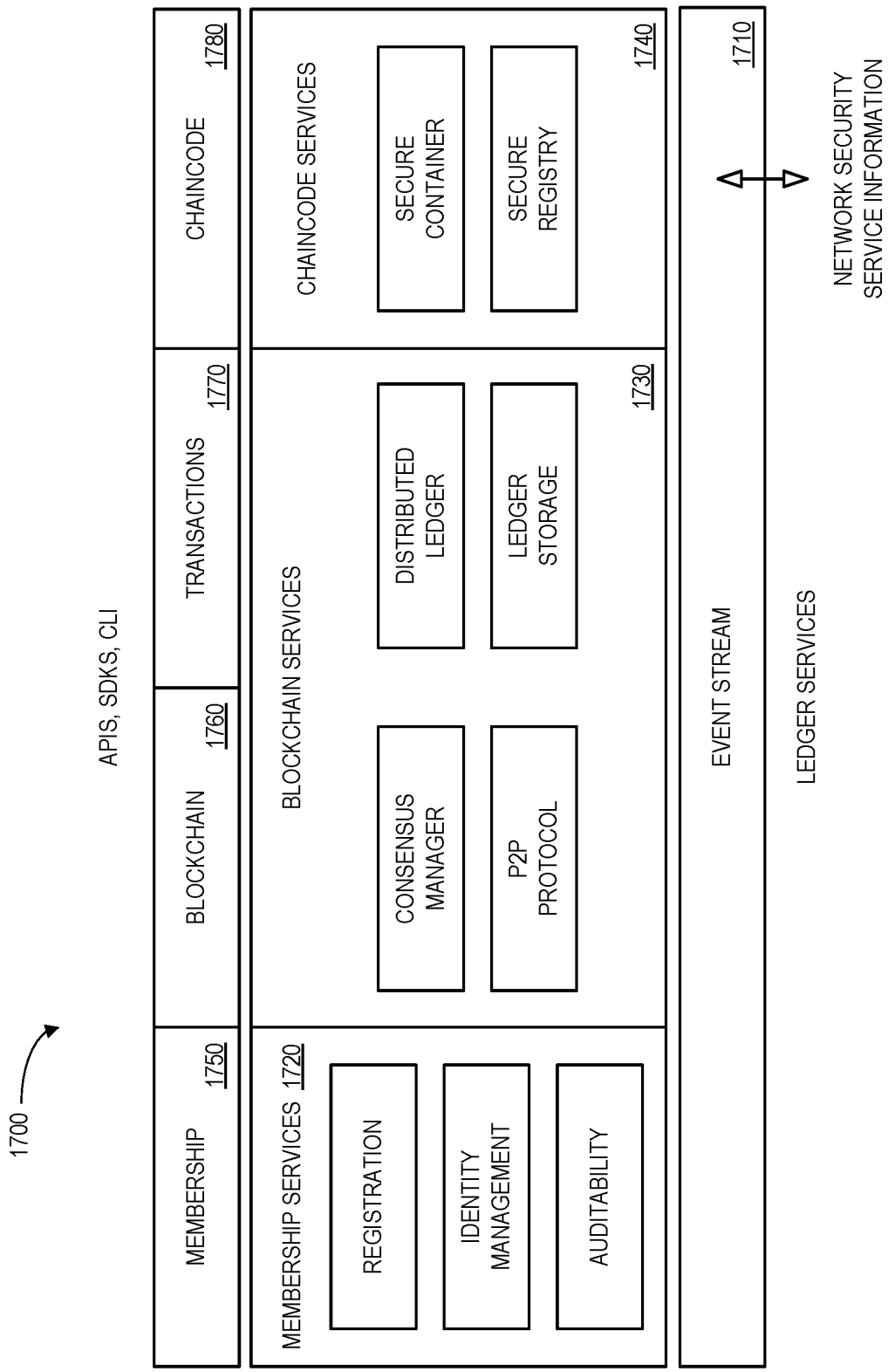
FIG. 17 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 17 is a distributed ledger reference architecture 1700 according to some embodiments. The architecture 1700 includes ledger services and an event stream 1710 that may contain network security service information (e.g., from an attestation server). Membership services 1720 (e.g., including registration, identity managements, and/or an auditability process) may manage identity, privacy, and confidentially for membership 1750 for the network security service. Blockchain services (e.g., including a consensus manager, Peer-to-Peer ("P2P") protocol, a distributed ledger, and/or ledger storage) may manage the distributed ledger through a P2P protocol built on HTTP to maintain a single state that replicated at many nodes to support blockchains 1760 and transactions 1770. Chaincode services (e.g., secure container and/or a secure registry associated with a smart contract) may help compartmentalize smart contract (or chaincode 1780) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1700.

Thus, some embodiments described herein may use blockchain verification to protect a network security service (such as a software verification attestation service or validator). The blockchain verification may act as a strong anchor of a root-of-trust for the top of the system while a TPM anchors the bottom. Moreover, any viewer can check the network security service against the blockchain.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 18:
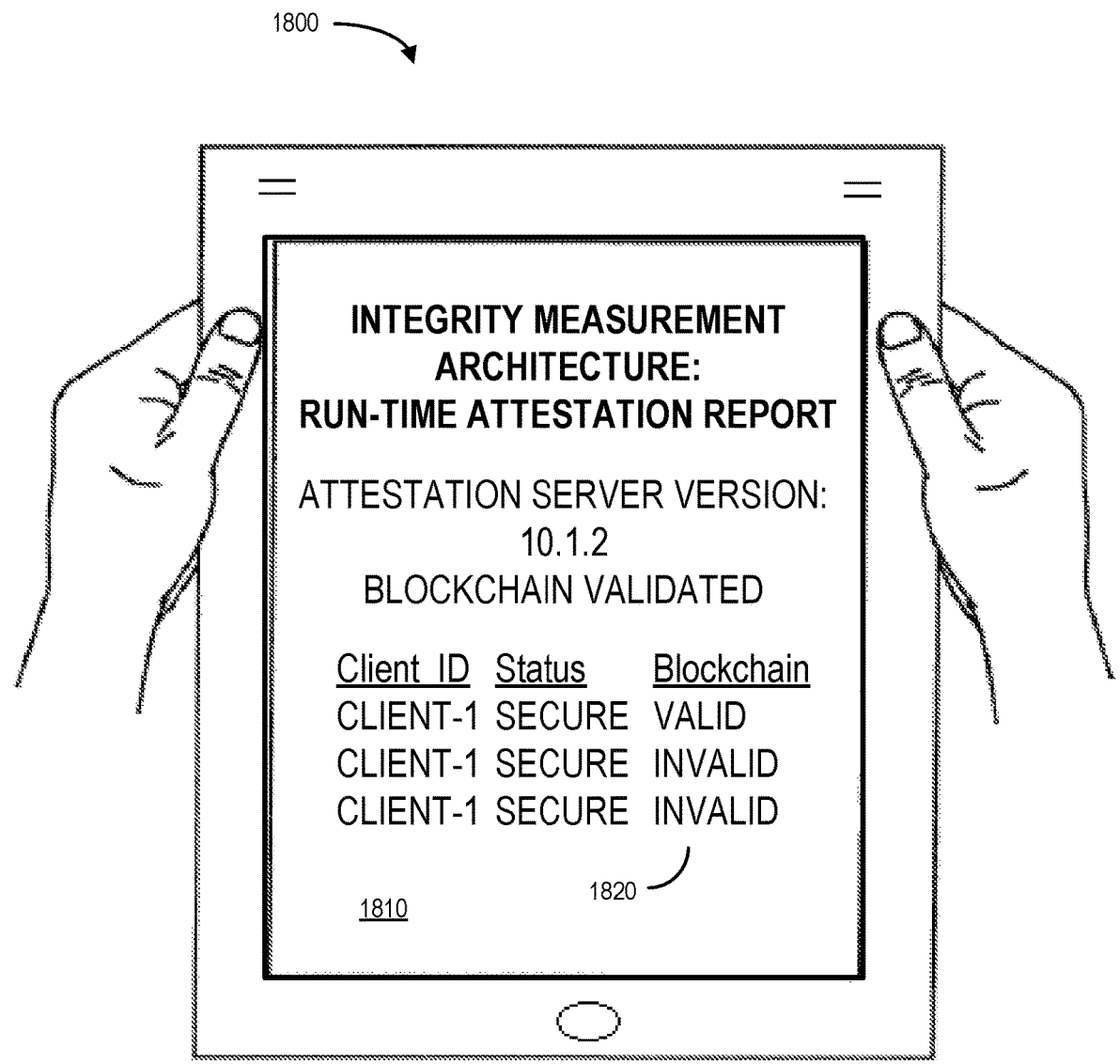
FIG. 18 illustrates a tablet computer providing a run-time attestation report display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to industrial control systems, note that embodiments might be associated with other types of computing systems, including non-industrial control systems and processors in general. Similarly, the displays shown and described herein are provided only as examples, and other types of displays and display devices may support any of the embodiments. For example, FIG. 18 illustrates a tablet computer 1800 providing a run-time attestation report display 1810 according to some embodiments. In particular, the attestation report display 1810 may be an interactive user interface (e.g., via a touchscreen) and includes a blockchain status 1820 in accordance with any of the embodiments described herein. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with an industrial control system, comprising:
   a communication port to exchange information with a client device; and
   an attestation server coupled to the communication port and including a computer processor adapted to:
      provide an integrity attestation service associated with software verification for the client device,
      record security information about the client device via a blockchain verification process, and
      generate an attestation report for a plurality of remote client devices, wherein the attestation report includes:

an overall blockchain validity indication, and
for each remote client device: a client identifier, a recorded date and time, a blockchain validity indication, and an attestation status indicating one of a secure status, a warning status, and a compromised status.

2. The system of claim 1, wherein the software being verified is associated with a program executing at the remote client devices, the program being associated with at least one of: (i) a basic input output system, (ii) an operating system, and (iii) an application.

3. The system of claim 1, wherein at least one remote client device is associated with at least one of: (i) a personal computer, (ii) a tablet computer, (iii) a server computer, (iv) a smartphone, (v) a microcontroller, (vi) an embedded access point, (vii) an embedded telecommunication base station, (viii) an embedded Internet of Things ("IoT") gateway, (ix) an embedded smart building automation device, and (x) a digital rights management device.

4. The system of claim 1, wherein the attestation report is associated with at least one of: (i) a single network cloud-hosted topology, (ii) a multiple network cloud-hosted topology, and (iii) a participant hosted intranet environment.

5. The system of claim 1, wherein said recording includes registering a validation result within a distributed ledger.

6. The system of claim 5, wherein said registering includes a smart contract transaction that records a device attestation status, a validation hash, a device identifier, and an attestation server identifier.

7. The system of claim 5, wherein said registering is associated with a public cryptography key associated with the attestation server.

8. The system of claim 5, wherein said registering is associated with a Trusted Platform Module ("TPM") of a remote client device providing a hardware root of trust for a measured and trusted boot associated with the industrial control system.

9. The system of claim 8, wherein the TPM signs platform configuration register values as proof of integrity.

10. A method associated with an industrial control system, comprising:
exchanging, at an attestation server, information with a client device;
providing an integrity attestation service associated with software verification for the client device;
recording security information about the client device via a blockchain verification process; and
generating an attestation report for a plurality of remote client devices, wherein the attestation report includes:
an overall blockchain validity indication, and
for each remote client device: a client identifier, a recorded date and time, a blockchain validity indication, and an attestation status indicating one of a secure status, a warning status, and a compromised status.

11. The method of claim 10, wherein the software being verified is associated with a program executing at the client device, the program being associated with at least one of: (i) a basic input output system, (ii) an operating system, and (iii) an application.

12. The method of claim 11, wherein said recording includes registering a validation result within a distributed ledger.

13. The method of claim 12, wherein said registering includes a smart contract transaction that records a device attestation status, a validation hash, a device identifier, and an attestation server identifier.

14. A system associated with an industrial control system, comprising:
a client device having a Trusted Platform Module ("TPM"); and
an attestation server, remote from the client device, including:
a communication port to exchange information with the client device; and
a computer processor coupled to the communication port and adapted to:
provide software verification for the client device based at least in part on information in the TPM,
record security information about the client device via a blockchain verification process by registering a validation result within a distributed ledger, and
generate an attestation report for a plurality of remote client devices, wherein the report includes:
an overall attestation server version number of the attestation server,
an overall blockchain validity indication, and
for each remote client device: a client identifier, a recorded date and time, a blockchain validity indication, and an attestation status indicating one of a secure status, a warning status, and a compromised status.

15. The system of claim 14, wherein said registering includes a smart contract transaction that records a device attestation status, a validation hash, a device identifier, and an attestation server identifier.

* * * * *